US009798499B2

(12) United States Patent
Bazzani

(10) Patent No.: US 9,798,499 B2
(45) Date of Patent: *Oct. 24, 2017

(54) HYBRID-DEVICE STORAGE BASED ON ENVIRONMENTAL STATE

(71) Applicant: Apple Inc., Cupertino, CA (US)

(72) Inventor: Khalu Bazzani, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 14/468,044

(22) Filed: Aug. 25, 2014

(65) Prior Publication Data
US 2015/0058540 A1    Feb. 26, 2015

Related U.S. Application Data

(63) Continuation of application No. 12/730,838, filed on Mar. 24, 2010, now Pat. No. 8,850,151.

(51) Int. Cl.
| | | |
|---|---|---|
| *G06F 3/06* | (2006.01) | |
| *G11B 19/04* | (2006.01) | |
| *G11B 20/12* | (2006.01) | |
| *G06F 11/14* | (2006.01) | |
| *G06F 11/16* | (2006.01) | |

(52) U.S. Cl.
CPC ............ *G06F 3/0685* (2013.01); *G06F 3/064* (2013.01); *G06F 3/068* (2013.01); *G06F 3/0614* (2013.01); *G06F 3/0619* (2013.01); *G06F 3/0631* (2013.01); *G06F 3/0688* (2013.01); *G11B 19/042* (2013.01); *G11B 19/046* (2013.01); *G11B 20/1217* (2013.01);
(Continued)

(58) Field of Classification Search
USPC .................................................. 711/103, 115
See application file for complete search history.

(56) References Cited

U.S. PATENT DOCUMENTS

5,333,138 A    7/1994  Richards et al.
5,664,096 A    9/1997  Ichinomiya et al.
(Continued)

OTHER PUBLICATIONS

Timothy Bisson, Scott A. Brandt, Darrell D.E. Long, "A Hybrid Disk-Aware Spin-Down Algorithm with I/O Subsystem Support," Performance, Computing, and Communications Conference, 2007. IPCCC 2007. IEEE International, pp. 236, 245, Apr. 11-13, 2007.
(Continued)

*Primary Examiner* — Yaima Rigol
(74) *Attorney, Agent, or Firm* — Blakely, Sokoloff, Taylor & Zafman LLP

(57) ABSTRACT

A hybrid storage device that includes a hard-disk drive (HDD) and a flash memory is described. When control logic in the hybrid storage device receives a request from an external device to write a block of data to a logical address in a first portion of an address space that maps to the HDD, the control logic writes the block of data to the HDD. However, if there is a change in environmental state information of the hybrid storage device during the write operation, the control logic writes at least a portion of the block of data to a logical address for the block of data in a second portion of the address space which maps to the flash memory. Note that the address space may be common to the external device and the hybrid storage device.

23 Claims, 6 Drawing Sheets

(52) U.S. Cl.
CPC .......... *G06F 11/1441* (2013.01); *G06F 11/16* (2013.01); *G06F 2003/0692* (2013.01); *G11B 2220/455* (2013.01)

(56) References Cited

U.S. PATENT DOCUMENTS

| | | | |
|---|---|---|---|
| 5,966,734 | A | 10/1999 | Mohamed et al. |
| 6,105,103 | A | 8/2000 | Courtright et al. |
| 7,117,399 | B2 | 10/2006 | Song |
| 7,254,592 | B1* | 8/2007 | Matero ............... G06F 9/466 |
| 7,318,118 | B2 | 1/2008 | Chu et al. |
| 7,411,757 | B2 | 8/2008 | Chu et al. |
| 7,644,239 | B2 | 1/2010 | Ergan et al. |
| 7,818,489 | B2* | 10/2010 | Karamcheti ......... G06F 9/5016 711/101 |
| 7,861,032 | B2 | 12/2010 | Song et al. |
| 7,975,095 | B2 | 7/2011 | Hsieh et al. |
| 8,151,064 | B2 | 4/2012 | Lee |
| 8,291,149 | B2* | 10/2012 | Azuma ................ G06F 3/061 711/103 |
| 8,370,558 | B2 | 2/2013 | Natarajan et al. |
| 2002/0083264 | A1* | 6/2002 | Coulson ............... G06F 3/0613 711/112 |
| 2005/0068653 | A1* | 3/2005 | Escobar .................. G11B 5/40 360/51 |
| 2007/0168602 | A1 | 7/2007 | Takai et al. |
| 2007/0168604 | A1 | 7/2007 | Takai et al. |
| 2007/0168605 | A1 | 7/2007 | Takai et al. |
| 2007/0288692 | A1* | 12/2007 | Bruce .................... G06F 3/061 711/113 |
| 2008/0025706 | A1 | 1/2008 | Yoshida et al. |
| 2008/0004660 | A1 | 2/2008 | Toyama et al. |
| 2009/0082068 | A1 | 3/2009 | Sakai |
| 2009/0313416 | A1 | 12/2009 | Nation |
| 2010/0037017 | A1 | 2/2010 | Ryu et al. |
| 2010/0088459 | A1* | 4/2010 | Arya ..................... G06F 3/061 711/103 |
| 2010/0169708 | A1* | 7/2010 | Rudelic ............. G06F 11/3471 714/15 |
| 2010/0281230 | A1* | 11/2010 | Rabii .................... G06F 3/0605 711/165 |
| 2010/0290149 | A1* | 11/2010 | Ahmad ................. G11B 21/12 360/71 |
| 2011/0072430 | A1 | 3/2011 | Mani |

OTHER PUBLICATIONS

Wang, An-I, Andy, et al., "The Conquest file system: Better performance through a disk/persistent-RAM hybrid design." ACM Transactions on Storage, vol. 2, No. 3, Aug. 2006, 309-348.

Bisson, Timothy and Scott A. Brandt. "Reducing hybrid disk write latency with flash-backed i/o requests." Modeling, Analysis, and Simulation of Computer and Telecommunication Systems, 2007. MASCOTS'07. 15th International Symposium on. IEEE, 2007.

Bisson, T.; Brandt, S.A.; Long, D.D.E, "NVCache: Increasing the Effectiveness of Disk Spin-Down Algorithms with Caching," Modeling, Analysis, and Simulation of Computer and Telecommunication Systems, 2006. MASCOTS 2006. 14th IEEE International Symposium on, pp. 422, 432, Sep. 11-14, 2006.

Young-Jin Kim; Sung-Jin Lee; Kangwon Zhang; Jihong Kim, "I/O Performace Optimization Techniques for Hybrid Hard Disk-Based Mobile Consumer Devices," Consumer Electronics, IEEE Transactions on, vol. 53, No. 4, pp. 1469, 1476, Nov. 2007.

* cited by examiner

HYBRID-DEVICE STORAGE BASED ON ENVIRONMENTAL STATE

This application is a continuation of co-pending U.S. application Ser. No. 12/730,838 filed on Mar. 24, 2010.

BACKGROUND

Field

The present disclosure relates to a hybrid storage device that includes different types of storage media and associated systems. More specifically, the present disclosure relates to a hybrid storage device in which blocks of data are stored in the different types of storage media based on an environmental state of the hybrid drive.

Related Art

While hard-disk drives (HDDs) are capable of storing large amounts of data at a low cost per byte, they can be sensitive to environmental conditions. In particular, operation of modern HDDs involves accurately maintaining the vertical and horizontal positions of read and write transducers within a few nanometers of a disk that is spinning at a rotational velocity in excess of 10,000 rpm. In addition, as the aerial density in HDDs increases, the current density in the read transducers increases, and the magnetic volume associated with a bit stored on the disk decreases. These design changes increase the sensitivity of HDDs to potential effects associated with ambient temperature and the thermal energy dissipated by HDDs, including: thermal runaway, electro-migration and superparamagnetism.

As a consequence, HDDs are increasingly sensitive to environmental conditions, such as changes in temperature, vibration and acceleration, which can disrupt operation of an HDD, and can result in HDD failure and/or loss of data. In turn, these limitations can adversely impact the performance of systems (such as computer systems) that include HDDs, and can necessitate additional data and storage-device redundancy that can increase the complexity and cost of these systems.

Hence, what is needed are a storage device, as well as a system that includes the storage device, which overcome the problems listed above.

SUMMARY

One embodiment of the present disclosure relates to a hybrid storage device that includes: a hard-disk drive (HDD), a flash memory, an interface circuit, and control logic. This control logic receives a request, via the interface circuit, from an external device to write a block of data to the hybrid storage device, where the request includes a logical address for the block of data in a first portion of an address space which maps to the HDD. In response to the request, the control logic writes the block of data to the HDD. Furthermore, if there is a change in environmental state information of the hybrid storage device during the write operation, the control logic writes at least a portion of the block of data to a logical address for the block of data in a second portion of the address space which maps to the flash memory. Note that the address space may be common to the external device and the hybrid storage device.

In some embodiments, the change in the environmental state information is associated with an operating state of the HDD in which failure or shut down of the HDD is to occur during the write operation. For example, the operating state of the HDD may be associated with: a change in an internal temperature of the HDD, acceleration of the HDD, and/or vibration of the HDD. Moreover, during the operating state one or more transducers in the HDD may be parked.

Additionally, the change in the environmental state information may include detecting an error associated with an operating state of the HDD. For example, the error may indicate that data stored on the HDD is at risk of imminent loss during the write operation.

In some embodiments, the first portion of the address space and the second portion of the address space are statically allocated. Alternatively, the first portion of the address space or the second portion of the address space can be reallocated when the HDD or the flash memory is reformatted. Furthermore, in some embodiments the first portion of the address space and the second portion of the address space may be dynamically allocated. This dynamic allocation may be based on: characteristics of an activity history of the external device and/or characteristics of an application executing on the external device.

In some embodiments, if a request is received from the external device to read a block of data from a logical address that maps to the HDD in the hybrid storage device, and the HDD is inoperative due to an environmental condition, the control logic accesses the block of data at a logic address which maps to the flash memory if the block of data is also stored on the flash memory.

Another embodiment provides a computer system that includes the hybrid storage device.

Another embodiment provides a method for writing blocks of data to the hybrid storage device. During operation, the control logic receives the request from the external device to write the block of data to the hybrid storage device, where the request includes the logical address for the block of data in the first portion of an address space which maps to the HDD. In response to the request, the control logic writes the block of data to the HDD. Furthermore, if there is a change in the environmental state information of the hybrid storage device during the write operation, the control logic writes at least a portion of the block of data to the logical address for the block of data in the second portion of the address space which maps to the flash memory.

Figure 1:
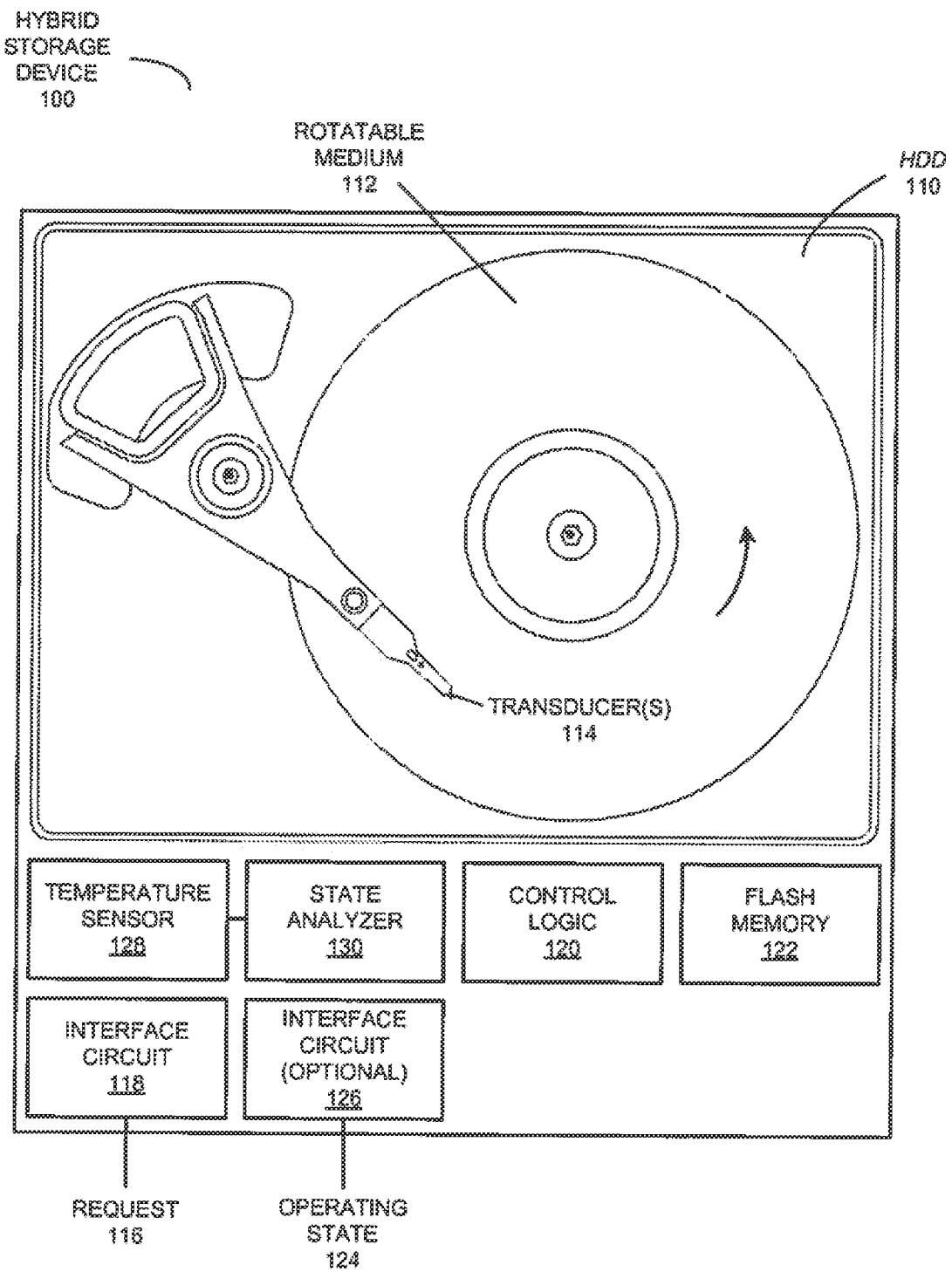
FIG. 1 is a block diagram of a hybrid storage device in accordance with an embodiment of the present disclosure.

Table 1 provides an example of the state information associated with the HDD in the hybrid storage device of FIG. 1 in accordance with an embodiment of the present disclosure.

DETAILED DESCRIPTION

Embodiments of a hybrid storage device, a computer system that includes the hybrid storage device, and a method for writing blocks of data to the hybrid storage device are described. This hybrid storage device includes a hard-disk drive (HDD) and a flash memory. When control logic in the hybrid storage device receives a request from an external device to write a block of data to a logical address in a first portion of an address space that maps to the HDD, the control logic writes the block of data to the HDD. However, if there is a change in environmental state information of the hybrid storage device during the write operation, the control logic writes at least a portion of the block of data to a logical address for the block of data in a second portion of the address space which maps to the flash memory. Note that the address space may be common to the external device and the hybrid storage device.

By selectively storing the block of data in the flash memory, the hybrid storage device can address the sensitivity of the HDD to changes in the environmental state of the hybrid storage device. For example, if the change in the environmental state information results in an operating state of the HDD in which failure or shut down of the HDD is to occur during the write operation, or if there is an imminent risk of data loss during the write operation, the write operation can be completed using the flash memory. Therefore, this storage technique can increase the reliability of the hybrid storage device. In addition, the storage technique can reduce or eliminate the performance impact associated with the change in the environmental state information on the computer system that includes the hybrid storage device, which can reduce the complexity and cost of the computer system.

We now describe embodiments of the hybrid storage device and the computer system. FIG. 1 presents a block diagram of a hybrid storage device 100. This hybrid storage device includes multiple cooperating mass-storage components within a standard form factor. In particular, hybrid storage device 100 includes: a high-capacity, long-access-time storage device (or mass-storage component) and a lower-capacity, smaller-access-time storage device (or mass-storage component). In the discussion that follows, HDD 110 is used as an illustration of the high-capacity, long-access-time storage device, and a flash memory 122 (such as NAND flash memory) is used as an illustration of the lower-capacity, smaller-access-time storage device. Both of these mass-storage components may be included in a standard 2.5" enclosure. However, in other embodiments a variety of non-volatile and/or volatile storage devices can be used in hybrid storage device 100.

During operation of hybrid storage device 100, control logic 120 may receive a request 116, via interface circuit 118, from an external device (such as computer system 300 in FIG. 3 and, more generally, an electronic device) to access a block of data on hybrid storage device 100, where request 116 includes a logical address for the block of data. For example, request 116 may include instructions to write the block of data to a logical address for the block of data in a first portion of an address space which maps to HDD 110 (which is described further below with reference to FIGS. 4 and 5). In response to request 116, control logic 120 writes the block of data to the HDD.

If there is a change in the environmental state information of hybrid storage device 100 during the write operation, control logic 120 may write at least a portion of the block of data to a logical address for the block of data in a second portion of the address space which maps to flash memory 122. In some embodiments, the change in the environmental state information is associated with an operating state 124 of HDD 110 in which failure or shut down of HDD 110 is to occur during the write operation. For example, operating state 124 of HDD 110 may be associated with: an internal temperature of HDD 110, a change in the internal temperature of HDD 110, acceleration of HDD 110, and/or vibration of HDD 110. Moreover, during operating state 124 one or more transducers 114 in HDD 110 (such as read or write heads) may be parked. Additionally, the change in the environmental state information may include detecting an error associated with operating state 124 of HDD 110. For example, the error may indicate that data stored on HDD 110 is at risk of imminent loss during the write operation. (As described further below, operating state 124 may be communicated to the external device via optional interface circuit 126.)

In this way, hybrid storage device 100 is able to complete the write operation without disruption or loss of data, which reduces or eliminates the need for the external device to repeat or retry the write operation. As a consequence, environmental issues that affect HDD 110 in hybrid storage device 100 may have a reduced impact on the reliability of hybrid storage device 100 and on the performance of electronic systems (such as the external device) that include or use hybrid storage device 100. These attributes may reduce or eliminate the need for additional data and/or storage-device redundancy in these electronic systems, which can decrease the complexity and cost of hybrid storage device 100 and/or the electronic systems.

As noted above, in an exemplary embodiment operating state 124 is associated with an internal temperature of HDD 110. When operating, a hard-disk drive (HDD) can generate a significant amount of thermal energy. If this thermal energy is not properly removed, the excessive heat can result in overheating of HDD 110.

Figure 3:
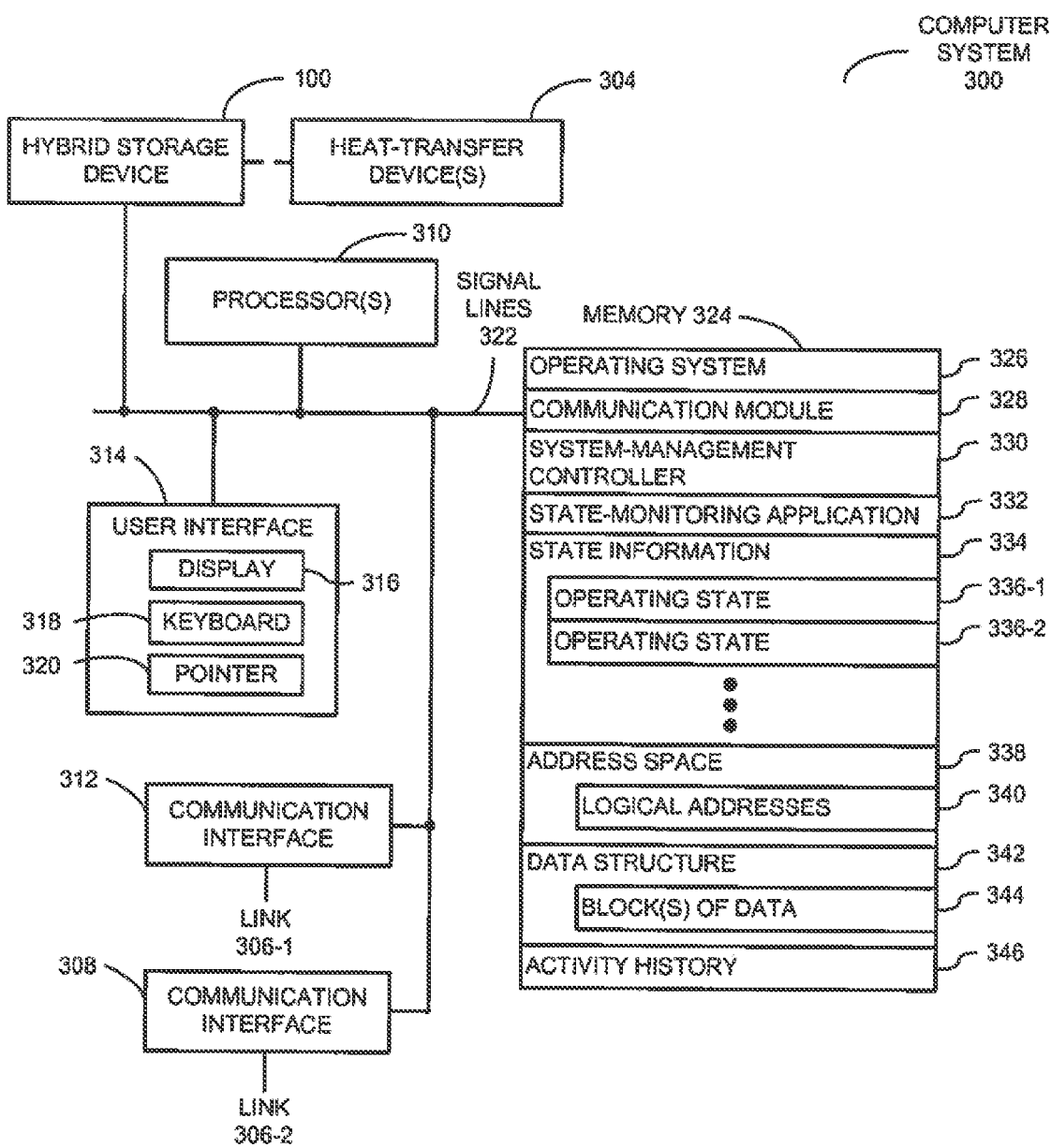
FIG. 3 is a block diagram of a computer system that includes the hybrid storage device of FIG. 1 in accordance with an embodiment of the present disclosure.

In order to manage the HDD temperature, a closed-loop thermal control system can be used in the external device that includes or uses HDD 110 (such as computer system 300 in FIG. 3). In particular, one or more embedded temperature sensors 128 in HDD 110 can measure the internal temperature during operation of HDD 110. Then, the measured internal temperatures can be communicated to a system-level thermal management controller in the external device, for example, via interface circuit 118, which may include: a serial ATA (SATA) interface, a Small Computer System Interface (SCSI) or a Serial Attached SCSI (SAS). Based on the internal temperature measurements, this system-level thermal management controller can adjust the heat removed from HDD 110 by one or more convective or conductive heat-transfer devices (such as a fan, a heat pipe, a heat sink, etc.). However, in the event of that one or more convective or conductive heat-transfer devices are unable to properly maintain the internal temperature of HDD 110 (for example, as indicated by operating state 124 of HDD 110), hybrid storage device 100 may be able to ensure reliable completion of a write operation.

To facilitate thermal management of HDD 110 by the external device, hybrid storage device 100 may include a mechanism for accurately assessing state information, such as operating states or thermal states of HDD 110. (However, as noted previously, in other embodiments the state information may include changes in a variety of environmental state information in addition to or separately from the thermal states.) In particular, the state information may be provided by a state analyzer 130. This state analyzer may assess the state of HDD 110 (and, more generally, hybrid storage device 100) using internal temperatures measured using temperature sensor 128, as well as information associated with the design and/or thermal tolerance of HDD 110. Consequently, state analyzer 130 may include functionality to characterize the state of HDD 110 beyond the absolute internal temperature measurements in FDD 110. As described further below with reference to Table 1 and FIG. 2, the operating states of HDD 110 may be associated with ranges of internal temperatures. Thus, there may be a many-to-one relationship between internal temperatures and operating states.

Because communication of the measured internal temperatures via interface circuit 118 can compete with normal data transfer and may involve custom drivers for a given HDD, in some embodiments the internal temperatures and/or the state information are communicated to the external device via a separate optional interface circuit 126, which is sometimes referred to as out-of-band (OOB) communication. For example, optional interface circuit 126 may use a unidirectional, low-speed serial link (with a data rate of less than 100 kb/s), such as an inter-integrated circuit (I²C) system bus or RS-232. However, in some embodiments interface circuit 118 is used to communicate the measured internal temperatures and/or the state information, as well as read and write data.

Table 1 provides an example of the state information, which may be stored on rotatable medium 112 or in a semiconductor memory (such as flash memory 122) during operation of HDD 110. Bits 0-2 in a given operating state may encode the internal temperature as a temperature offset within a given range of temperatures (see below). In particular, the given operating state may encode a temperature offset from a thermal boundary in a given range of internal temperatures. For example, the temperature offset may correspond to a number of degrees C below a thermal state boundary. Therefore, as the internal temperature increases in the given range of internal temperatures, the temperature offset may decrease. Note that a temperature offset of '0' may indicate that HDD 110 is at a thermal state boundary, such that any further increase in the internal temperature will take HDD 110 into another range of internal temperatures. In addition, temperature offsets greater or equal to 7 C below the top thermal state boundary of the current range of internal temperatures may be reported as a '7' (e.g., '111').

TABLE 1

| Bit(s) | Values | Comment |
| --- | --- | --- |
| 0-2 | 000-111 | Temperature offset |
| 3, 4 | 00 | Normal operating range |
| 3, 4 | 01 | Degraded operating range |
| 3, 4 | 10 | Severely degraded operating range |
| 3, 4 | 11 | Thermal emergency range |
| 5, 6 | 00 | One-byte message |
| 5, 6 | 01-11 | Other types of messages |
| 7 | 0 | Specifies baud rate or stop |

Furthermore, bits 3 and 4 in a given operating state may specify the range of internal temperatures. In particular, the ranges of internal temperatures may include: a normal operating state (bit 3 equal to '0' and bit 4 equal to '0'); a degraded operating state in which the functionality and reliability of HDD 110 are compromised (bit 3 equal to '1' and bit 4 equal to '0'); a severely degraded state in which data integrity within HDD 110 is compromised (bit 3 equal to '0' and bit 4 equal to '1'); and a thermal emergency state in which HDD 110 is at risk of failure (bit 3 equal to '1' and bit 4 equal to '1').

In addition, bits 5 and 6 may be used to convey a message type or code. For example, bit 5 equal to '0' and bit 6 equal to '0' may indicate a one-byte message or frame of data, while other encodings may be used for messages of other types and/or lengths (e.g., 5-7 bits). Bit 7 may store a fixed value (e.g., '0') at the end of every message transmitted using bits 0-7. In some embodiments, bit 7 is used to determine a data rate associated with optional interface circuit 126. In particular, during transmission of a given message the interval between the start of bit 0 and the end of bit 7 may be used to calculate a baud rate associated with the transmission of these bits via optional interface circuit 126. For example, the baud rate of optional interface circuit 126 may be 100 baud if the interval between the start of bit 0 and the end of bit 7 is 90 ms. On the other hand, optional interface circuit 126 may transmit bits 0-7 at 200 baud if the interval between the start of bit 0 and the end of bit 7 is 45 ms.

The calculated baud rate may then be used to identify the individual bits within the frame of data from signals received using optional interface circuit 126. The transmission time of each bit and the identification of a suitable bit sampling time may be determined by the use of integer division of the frame duration by the number of transmitted bits in conjunction with a continuously updated integer error term. The use of bit 7 to identify the boundaries of the frame, the positions of bits 0-7 within the frame, and/or an error term may enable the transmission of different frames of data (e.g., from multiple HDDs) at different baud rates without: handshaking, fine-grained measurement techniques, high-precision time sources, and/or other specialized hardware.

Note that during regular operation of hybrid storage device 100, updating of the state information and frame transmission via optional interface circuit 126 may occur regularly (such as every 100 ms or minute). This may not be the case during power saving or sleep modes. Consequently, frame transmissions may end at any time, and hybrid storage device 100 may not complete transmission of a given frame or message before entering a sleep state.

Those skilled in the art will appreciate that state information may be allocated among bits 0-7 and/or other bits in various ways. For example, additional bits may be used to encode the thermal state boundary and/or temperature offset if HDD 110 has wide operating ranges and/or is to be characterized at a higher granularity. Similarly, multiple frames of data may be used to transmit the state information if more than eight bits are required to encode the thermal state of HDD 110.

Figure 2:
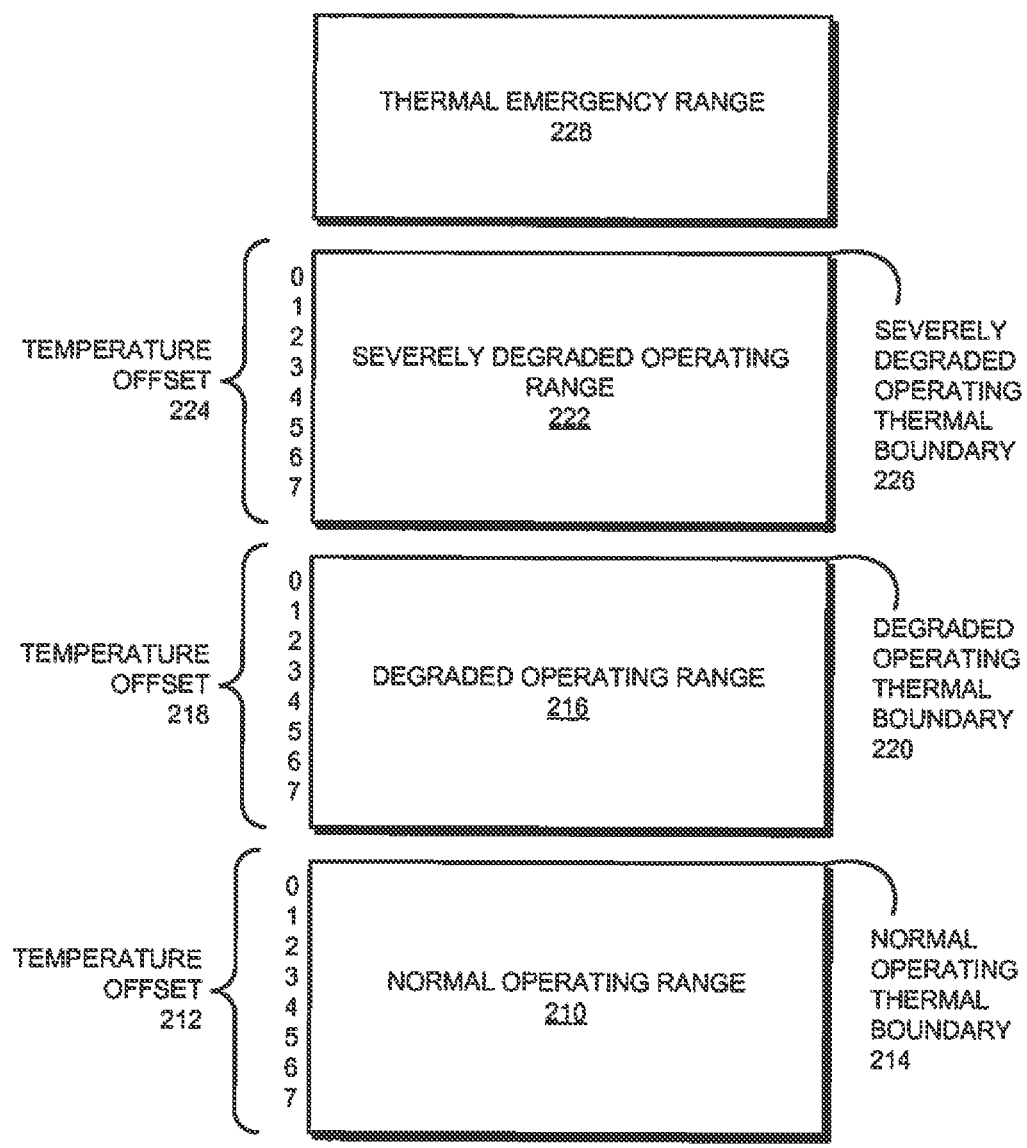
FIG. 2 is a drawing illustrating operating states for the HDD in the hybrid storage device of FIG. 1 in accordance with an embodiment of the present disclosure.

FIG. 2 presents a drawing illustrating operating states for HDD 110 (FIG. 1), including temperature ranges 210, 216, 222 and 228 (which are separated by thermal boundaries 214, 220 and 226) and temperature offsets 212, 218 and 224. As discussed previously, temperature ranges 210, 216, 222 and 228 and thermal boundaries 214, 220 and 226 may be used to characterize the operating state of HDD 110 (and, in particular, the thermal state of HDD 110). In particular, the temperature ranges may include: a normal operating range 210, a degraded operating range 216, a severely degraded operating range 222, and a thermal emergency range 228.

Likewise, the thermal boundaries may include: a normal operating thermal boundary 214, a degraded operating thermal boundary 220, and a severely degraded operating thermal boundary 226.

Normal operating range 210 may correspond to a range of temperatures that represent normal, undegraded operation of HDD 110. For example, the temperature of HDD 110 may be in normal operating range 210 if HDD 110 is idle and/or operating at low intensity. The top end of normal operating range 210 may be denoted by normal operating thermal boundary 214. Furthermore, if the temperature of HDD 110 is within normal operating range 210, the thermal state of HDD 110 may be reported as a temperature offset 212 of 0 to 7 degrees below normal operating thermal boundary 214 (e.g., using a set of temperature offset bits).

Degraded operating range 216 may correspond to a range of temperatures that represent a decrease in the functionality and reliability of HDD 110. For example, HDD 110 may enter degraded operating range 216 if use of HDD 110 is heavier than usual. The top end of degraded operating range 216 may be denoted by degraded operating thermal boundary 220. As with normal operating range 210, the thermal state of HDD 110 may be provided as a temperature offset 218 of 0 to 7 degrees below degraded operating thermal boundary 220 if the temperature of HDD 110 is in degraded operating range 216.

Severely degraded operating range 222 may correspond to temperatures that indicate a significant loss of integrity in HDD 110. For example, severely degraded operating range 222 may be encountered if HDD 110 is being cooled improperly and/or used heavily for an extended period of time. Severely degraded operating thermal boundary 226 may signify the top end of severely degraded operating range 222, and the thermal state of HDD 110 may be provided as a temperature offset 224 of 0 to 7 degrees below severely degraded operating thermal boundary 226 if the temperature of HDD 110 is in severely degraded operating range 222.

Finally, thermal emergency range 228 may correspond to a thermal emergency state, in which HDD 110 reaches temperatures that represent imminent failure. For example, temperatures in thermal emergency range 228 may indicate that HDD 110 is in danger of physically malfunctioning and/or shutting down. In other words, HDD 110 may require immediate cooling and/or suspension of use to prevent failure and/or fire if the thermal state of HDD 110 is reported to be in thermal emergency range 228. Because all temperature offsets within thermal emergency range 228 may be equally bad, temperatures in thermal emergency range 228 may not be provided as offsets.

As mentioned previously, the thermal state of HDD 110 may be characterized in multiple ways. For example, HDD 110 may be associated with only two temperature ranges: an acceptable range and an unacceptable range. The acceptable range may represent normal operation of HDD 110, while the unacceptable range may represent degraded operation of HDD 110. Thus, HDD 110 may require additional cooling if the temperature of HDD 110 enters the unacceptable range. Alternatively, HDD 110 may be associated with more than four temperature ranges for finer-grained characterization of the thermal state of HDD 110.

Furthermore, temperature ranges and thermal state boundaries of HDD 110 may be based on the design of HDD 110. For example, the thermal tolerance may be based on the manufacturer and/or model of the HDD. An HDD with a higher thermal tolerance may include temperature ranges and thermal boundaries that skew higher than an HDD with a lower thermal tolerance. Consequently, thermal state information that is based on temperature ranges and thermal boundaries of the HDD may allow the HDD's thermal state to be assessed more accurately than an absolute internal temperature measurement of the HDD.

Referring back to FIG. 1, while the preceding discussion illustrated the ability of hybrid storage device 100 to selectively write the block of data to HDD 110 or flash memory 122 based on a change in environmental state information, in other embodiments the external device may instruct hybrid storage device 100 to store the block of data associated with request 116 in either of these mass-storage components, for example, when there is a change in the environmental state information. To facilitate this capability, the address space of hybrid storage device 100 may be common to the external device and hybrid storage device 100 (which is sometimes referred to as 'unified logical block addressing') so that the external device can determine which logical addresses are in the first portion of the address space (and thus map to HDD 110), and which logical addresses are in the second portion of the address space (and thus map to flash memory 122). In particular, if the external device is aware of the current partitioning of the address space between HDD 110 and flash memory 122, and there is an adverse change in the reported operating state 124 (which indicates that HDD 110 may shut down, or that data may be lost or degraded), the external device can instruct hybrid storage device 100 (via one or more requests) to complete the write operation by storing at least a portion of the block of data in flash memory 122. In addition, as described further below, by sharing the address space with the external device, the external device may be able to improve performance by leveraging the relative performance capabilities of HDD 110 and flash memory 122.

FIG. 3 presents a block diagram of a computer system 300 that includes hybrid storage device 100. This computer system includes: one or more processors 310 (or processor cores or elements), communication interfaces 308 and 312, a user interface 314, and one or more signal lines 322 coupling these components together. Note that the one or more processors 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

In this discussion, a 'computer' or 'computer system' includes one or more electronic devices that are capable of manipulating computer-readable data or communicating such data between two or more computer systems over a network, including: a personal computer, a laptop computer, a mainframe computer, a server, a work station, a portable-computing device or a portable electronic device (such as a cellular phone or personal digital assistant that a user can readily carry or move from one location to the next), a personal organizer, a client computer (in a client-server architecture), a digital signal processor, a game console, an MP3 player, a device controller, and/or a computational engine within an appliance. Furthermore, a 'keyboard' includes a user interface device (or, more generally, an input device) with physical or virtual keys (such as on a touch-sensitive display) that a user can activate by moving one or more digits to provide alphanumeric information. Additionally, a 'mouse' includes a user interface device (or, more generally, an input device) that a user can move or manipulate (for example, by moving their hand or clicking on a button) to move a cursor (or, more generally, an icon on a display where characters can be entered, corrected or deleted) or to select an object (such as displayed text). Note that a 'display' may include a wide variety of devices that can present information or receive user instructions, including: a cathode ray tube, a liquid-crystal display, a light-emitting-diode display, a projection display, a touch-sensitive display (or touch screen), a flexible display (such as a polymer display), an organic light-emitting-diode display, an electronic-ink display, etc.

Memory 324 in the computer system 300 may include volatile memory and/or non-volatile memory that are configured to store information. More specifically, memory 324 may include: ROM, RAM, EPROM, EEPROM, flash memory, one or more smart cards, one or more magnetic disc storage devices, magnetic tape, one or more optical storage devices, and/or other media capable of storing code and/or data now known or later developed. Memory 324 may store an operating system 326 that includes procedures (or a set of instructions) for handling various basic system services for performing hardware-dependent tasks. While not explicitly indicated in computer system 300, in some embodiments operating system 326 includes a web browser, such as: Internet Explorer™ (from Microsoft Corporation, of Redmond, Wash.), Safari™ (from Apple Inc., of Cupertino, Calif.), and/or Firefox (from the Mozilla Foundation, of Mountain View, Calif.). Additionally, memory 324 may store procedures (or a set of instructions) in a communication module 328. These communication procedures may be used for communicating with hybrid storage device 100 (FIG. 1), as well as one or more computers and/or servers (including computers and/or servers that are remotely located with respect to computer system 300). For example, via communication interface 312 and link 306-1, communication module 328 may provide the write data to and receive the read data from hybrid storage device 100.

Memory 324 may also include multiple program modules (or sets of instructions), including: system-management controller 330 (or a set of instructions) and state-monitoring application 332 (or a set of instructions). Note that one or more of these program modules (or sets of instructions) may constitute a computer-program mechanism.

During operation of computer system 300, state information 334 (including operating states 336) may be received from hybrid storage device 100 via communication interface 308 and link 306-2. In the case where operating states 336 include thermal information, system-management controller 330 may manage the internal temperature of HDD 110 (FIG. 1) based on one or more operating states 336 and/or the rate of change of the temperature offset by adjusting one or more convective or conductive heat-transfer devices 304, such as a fan, a heat pipe, a heat sink, etc.

In addition, if state-monitoring application 332 determines that a change in the current operating state of HDD 110 (FIG. 1) indicates that data may be lost or corrupted, or that HDD 110 may shut down (such as if a large acceleration occurs when hybrid storage device 100 is dropped), state-monitoring application 332 may instruct hybrid storage device 100 to store one or more blocks of data (such as one of blocks of data 344 in data structure 342) on flash memory 122 (FIG. 1). In particular, state-monitoring application 332 may instruct hybrid storage device 100 to store at least a portion of a block of data (such as a block of data associated with a current write operation) to flash memory 122 using one or more logical addresses 340 in an address space 338 of hybrid storage device 100 that are associated with flash memory 122. Note that address space 338 may be an internal data structure that is used to translate from virtual addresses to physical addresses, such as those associated with a given mass-storage component. For example, address space 338 may include page tables for each application, process or thread that is executed by computer system 300.

In some embodiments, system-management controller 330 and/or state-monitoring application 332 monitor and control other physical properties of HDD 110 (FIG. 1) in addition to the thermal state via operating states 336. For example, operating states 336 may include: pressure (such as an altitude sensor output), humidity, motion, acceleration (such as shock or a free-fall sensor output), vibration, light intensity, and/or other physical attributes of HDD 110 (and, more generally, of hybrid storage device 100) within a mechanical, electrical, and/or other engineering system.

Figure 4:
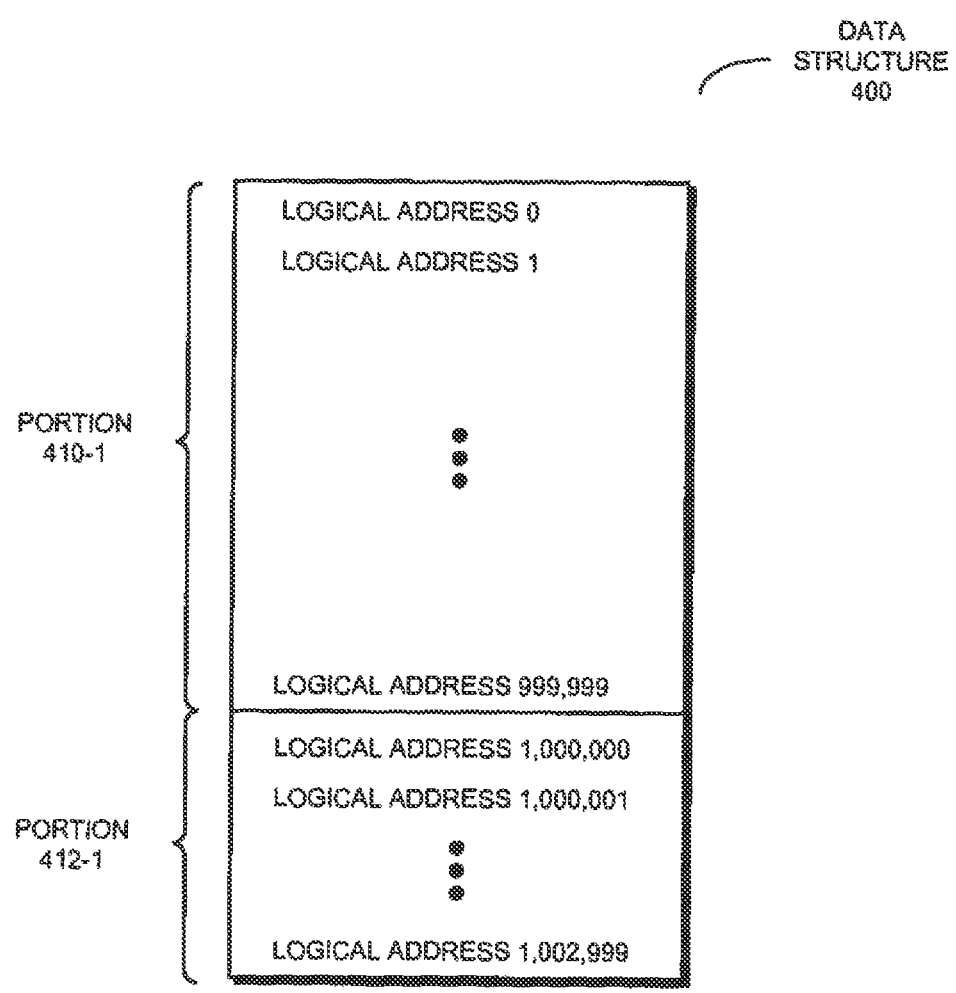
FIG. 4 is a block diagram of a data structure, which includes an address space, for use in the computer system in FIG. 3 in accordance with an embodiment of the present disclosure.
Figure 5:
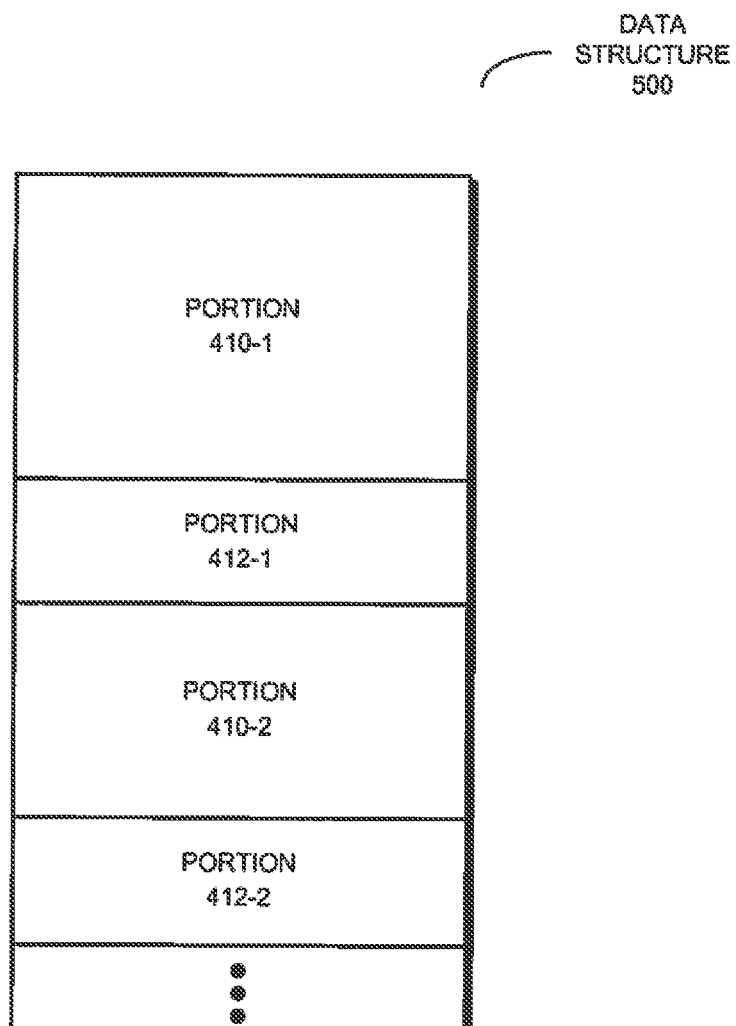
FIG. 5 is a block diagram of a data structure, which includes an address space, for use in the computer system in FIG. 3 in accordance with an embodiment of the present disclosure.

The logical addresses 340 in address space 338 may be mapped to the mass-storage components in hybrid storage device 100 in a variety of ways. For example, as shown in FIG. 4, which presents a block diagram of a data structure 400, logical addresses in the address space may be divided between a first portion 410-1 of logical addresses associated with HDD 110 (FIG. 1) and a second portion 412-1 of logical addresses associated with flash memory 122 (FIG. 1). For example, 1 M logical addresses may be associated with HDD 110, and a few thousand logical addresses may be associated with flash memory 122. Alternatively, as shown in FIG. 5, which presents a block diagram of a data structure 500, there may be multiple interleaved portions 410 and 412, which are respectively associated with HDD 110 and flash memory 122.

Referring back to FIG. 3, as noted previously by exposing the details of the current logical-address mapping in the address space to computer system 300, this unified-logical-block-addressing technique can also allow computer system 300 to improve performance. For example, computer system 300 may instruct hybrid storage device 100 to store information having different storage-time criteria in different mass-storage components using the appropriate logical addresses in requests. In particular, first information having a first storage-time criterion may be stored in the HDD, and second information having a second storage-time criterion (which is less than the first storage criterion) may be stored in the flash memory. Thus, the logical addresses of the second information may be assigned or selected by computer system 300 so that this information is stored in the flash memory. For example, a swap space of computer system 300, files that are accessed within a predetermined time interval by computer system 300 (such as less than 100 ms), and/or information used during a boot cycle of computer system 300 (such as sector 0 on the HDD) may be stored in the flash memory. Similarly, data that is used infrequently may be stored in the HDD. More generally, information may be stored in hybrid storage device 100 based on an analysis of the performance impact, such as based on previously determined performance during execution of one or more applications, processes or threads, which may be stored in an activity history 346.

Note that the first information may be stored in the HDD and may not be stored in the flash memory. Similarly, the second information may be stored in the flash memory and may not be stored in the HDD. Alternatively, at least a portion of the first information and/or the second information may be stored in the HDD and the flash memory.

In some embodiments, logical addresses in the address space are statically allocated or mapped to the HDD and the flash memory. Alternatively, logical addresses in the address space can be reallocated when the HDD or the flash memory is reformatted (such as when at least a sector is reformatted).

However, in some embodiments logical addresses in the address space may be dynamically allocated by computer system 300 and/or hybrid storage device 100. This may allow adaptation based on changing usage scenarios in activity history 346. For example, the dynamic allocation may be based on activity-history characteristics and/or characteristics of one or more applications, processes or threads executing on computer system 300.

Thus, logical addresses may be mapped to the 'best suited' mass-storage component based on the characteristics of these mass-storage components. For example, if a specific block of data is accessed frequently and is currently stored in the HDD, the block of data may be swapped with another block of data that was stored on the flash memory, and the respective logical addresses associated with these blocks of data may be reallocated or remapped in the address space. In some embodiments, there is a so-called 'free-space pool,' in which the next 1 kB block of data is stored in the flash memory and the rest is stored in the HDD.

In some embodiments, hybrid storage device 100 can be used to reduce power consumption. For example, the HDD and/or the flash memory may be turned off or placed into a low power-consumption state based on the current applications, processes and/or threads executed by computer system 300. Thus, hybrid storage device 100 may remain active even while one or more mass-storage components are in the low power-consumption slate.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310.

Although computer system 300 is illustrated as having a number of discrete components, FIG. 3 is intended to be a functional description of the various features that may be present in computer system 300 rather than a structural schematic of the embodiments described herein. In practice, and as recognized by those of ordinary skill in the art, the functions of computer system 300 may be distributed over a large number of servers or computers, with various groups of the servers or computers performing particular subsets of the functions. For example, computer system 300 may include a cloud computing system or a client-server computing system.

Furthermore, in some embodiments hybrid storage device 100 (FIG. 1), computer system 300, data structure 400 (FIG. 4) and/or data structure 500 (FIG. 5) include fewer or additional components. Moreover, two or more components may be combined into a single component and/or a position of one or more components may be changed. Note that in some embodiments the functionality of computer system 300 may be implemented more in hardware and less in software, or less in hardware and more in software, as is known in the art. In some embodiments, some or all of the functionality of computer system 300 is implemented in one or more application-specific integrated circuits (ASICs) and/or one or more digital signal processors (DSPs).

While the preceding discussion used HDD 110 (FIG. 1) and flash memory 122 (FIG. 1) as an illustrative example, in other embodiments hybrid storage device 100 (FIG. 1) can include a wide variety of memory devices and components, such as: a removable media drive, magnetic tape, a semiconductor memory (for example, RAM, ROM, EPROM, EEPROM, etc.), a solid-state memory, an optical storage device (for example, a holographic storage device, a CD-ROM, a digital versatile disc or digital video disc, an electro-optic storage device, etc.), and/or another memory that stores information at least temporarily.

Furthermore, while the preceding discussion used a write operation as an illustration, in other embodiments the storage technique may be used during a read operation if there is a change in the environmental state information. Additionally, the storage technique may be used separately from or after a given operation (such as a write operation) is completed. Thus, if a thermal emergency occurs in the HDD, subsequent write or read operations may be performed with the flash memory until the operating state changes (for example, to the normal operating range). For example, if a request is received from the external device to read a block of data from a logical address that maps to the HDD in the hybrid storage device, and the HDD is inoperative due to an environmental condition (such as when the HDD is parked/powered off or in a degraded operating state), the control logic accesses the block of data at a logic address which maps to the flash memory if the block of data is also stored on the flash memory. Note that if the flash memory is full, this access operation may be read only.

However, this storage technique may be used during a read operation even if the block of data is not initially stored on the flash memory when the HDD transitions to the parked/powered off or the degraded operating state. For example, if the data rate of a communication link between the HDD and the flash memory in the hybrid storage device is larger than the data rate between the hybrid storage device and the external device, when there is a change in the environmental state information during a read operation, at least a portion of the block of data being read from the HDD may be transferred to the flash memory prior to parking or powering off the HDD. In this way, the hybrid storage device can complete the read operation to the external device even after the HDD is inoperative.

In some embodiments, if the external device is executing an application, such as a word-processing application, and the HDD transitions to an inoperative or degraded operating state, systems files (such as display drivers) may be transferred from the HDD to the flash memory in the hybrid storage device prior to parking or powering off the HDD. This caching technique may allow the application to be executed by the external device even if the HDD is subsequently inoperative.

Similarly, using this caching technique, if operating system files are stored on the flash memory in the hybrid storage device and the HDD becomes inoperative, the external device can still function. Note that if the flash memory is smaller than the HDD it may be read-only during this operating state. By allowing the external device to continue functioning, this caching technique may allow the operating system to alert a user, who could then save their files to another storage device.

Figure 6:
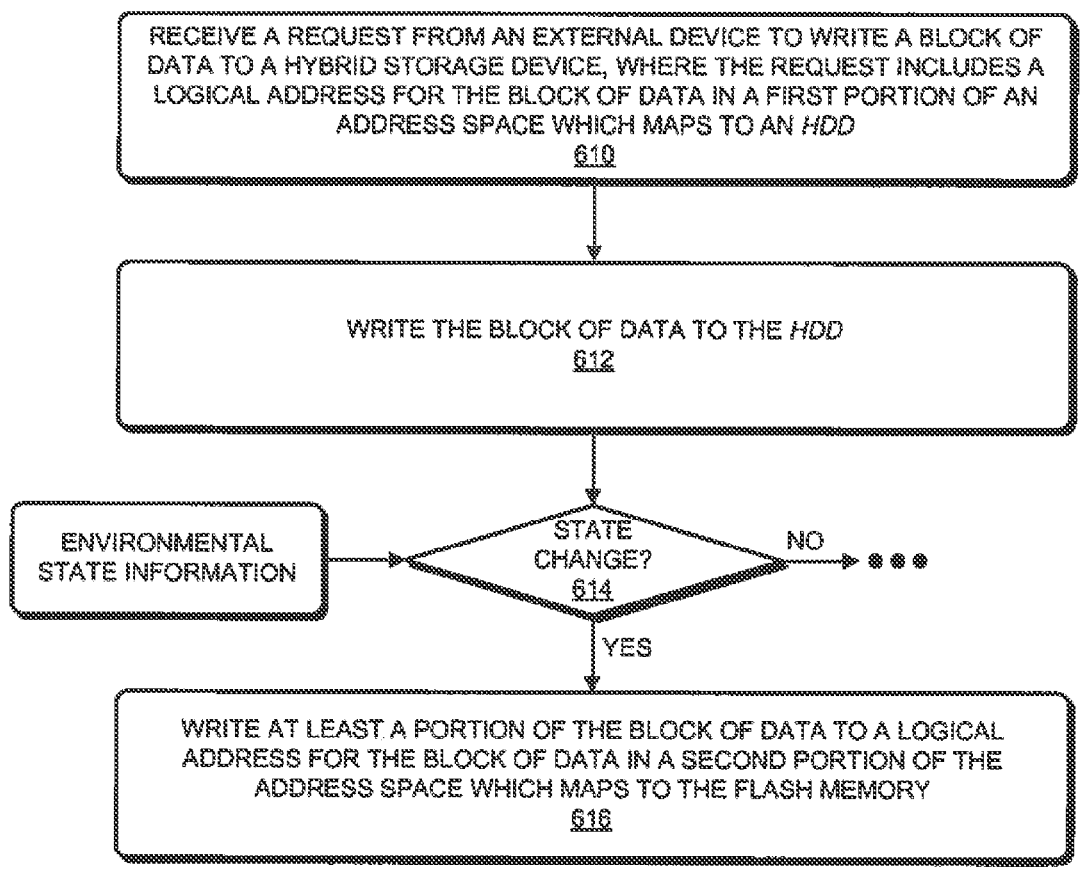
FIG. 6 is a flow diagram of a method for writing blocks of data to the hybrid storage device of FIG. 1 in accordance with an embodiment of the present disclosure.

We now describe embodiments of the method. FIG. 6 presents a flow diagram of a method 600 for writing a block of data to a hybrid storage device, such as hybrid storage device 100 (FIG. 1). During operation, control logic in the hybrid storage device receives the request from the external device to write the block of data to the hybrid storage device (operation 610), where the request includes the logical address for the block of data in the first portion of an address space which maps to the HDD. In response to the request, the control logic writes the block of data to the HDD (operation 612). Furthermore, if there is a change in the environmental state information of the hybrid storage device during the write operation (operation 614), the control logic writes at least a portion of the block of data to the logical address for the block of data in the second portion of the address space which maps to the flash memory (operation 616). Note that the address space may be common to the external device and the hybrid storage device.

In some embodiments of method 600, there may be additional or fewer operations. Moreover, the order of the operations may be changed and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A hybrid storage device comprising:
multiple non-volatile storage devices having differing performance characteristics;
control logic coupled to the multiple non-volatile storage devices, the control logic to receive a request from an external device to write a block of data to a first address in a first portion of an address space mapping to a first device of the multiple non-volatile storage devices and to write at least a first portion of the block of data to the first address in response to the request, wherein the address space is common to the external device and the hybrid storage device, and wherein the external device is to assign the mapping of the address space to the first device and the address space includes addresses that refer to memory on the external device; and
wherein the control logic is further to write at least a second portion of the block of data to a second address in a second portion of the address space which maps to a second device of the multiple non-volatile storage devices in response to a change in environmental state of the hybrid storage device.

2. The hybrid storage device of claim 1, wherein the first portion of the address space and the second portion of the address space are statically allocated.

3. The hybrid storage device of claim 1, wherein the first portion of the address space and the second portion of the address space are dynamically allocated based on characteristics of an activity history of the external device.

4. The hybrid storage device of claim 1, wherein the first portion of the address space and the second portion of the address space are dynamically allocated based on characteristics of an application stored on the hybrid storage device and executing on the external device.

5. The hybrid storage device as in claim 1, wherein the address space includes a data structure to translate from a virtual address on the external device to a physical address corresponding to one of the multiple non-volatile storage devices.

6. The hybrid storage device as in claim 1 the change in environmental indicates that the first device has entered one of multiple degraded operating states.

7. The hybrid storage device of claim 6 wherein the change in the environmental state is associated with an operating state that indicates a failure is to occur during a write operation to the first device.

8. The hybrid storage device of claim 6 wherein the first device is a hard disk drive including one or more transducers and the operating state indicates one or more of the transducers are parked.

9. The hybrid storage device of claim 6, wherein the change in the environmental state is associated with a change in an internal temperature of the first device and multiple degraded operating states are associated with the internal temperature of the first device, the multiple degraded operating states including a first degraded operating state, a second degraded operating state, and a thermal emergency state.

10. The hybrid storage device of claim 1, wherein the change in the environmental state is associated with an output from a motion sensor including a free-fall sensor.

11. The hybrid storage device of claim 10, wherein the motion sensor includes a vibration shock sensor.

12. The hybrid storage device of claim 11 wherein the second device is a solid-state disk.

13. A hybrid storage device, comprising:
multiple non-volatile storage devices having differing performance characteristics;
control logic coupled to the multiple non-volatile storage devices and configured to:
receive a request from an external device to read a block of data from the hybrid storage device, wherein the request includes a first address for the block of data in a first portion of an address space mapping to a first device of the multiple non-volatile storage devices, wherein the address space is common to the external device and the hybrid storage device, and wherein the external device is to assign the mapping of the address space to the first device and the address space includes addresses that refer to memory on the external device; and
in response to the request, access the block of data at a second address in a second portion of the address which maps to a second device of the multiple non-volatile storage devices, wherein the first device is inoperative due to an environmental condition.

14. The hybrid storage device of claim 13 wherein the environmental condition causes a degraded operating state for the first device and the degraded operating state is one of multiple degraded operating states.

15. The hybrid storage device of claim 14 wherein the first device is a hard disk drive having one or more parked transducers while in an operating state.

16. The hybrid storage device of claim 15, wherein the hybrid storage device additionally comprises a motion sensor including a free-fall sensor.

17. The hybrid storage device of claim 14, wherein the degraded operating state is one of multiple degraded operating states associated with an internal temperature of the first device, the multiple degraded operating states including a first degraded operating state associated with a first temperature boundary, a second degraded operating state associated with a second temperature boundary, and a thermal emergency state associated with a third temperature boundary, the third temperature boundary higher than the first and second temperature boundary.

18. The hybrid storage device as in claim 13, wherein the address space includes a data structure to translate from a virtual address on the external device to a physical address corresponding to one of the multiple non-volatile storage devices.

19. A data processing system having one or more processors coupled to memory, the system comprising:
one or more processors to execute a process stored in the memory;
a hybrid storage device comprising multiple non-volatile storage devices having differing performance characteristics;
a data structure to translate from a virtual address in the memory to a physical address corresponding to one of the multiple non-volatile storage devices; and
control logic coupled to the hybrid storage device, the one or more processors and the memory, wherein the control logic is configured to:
receive a request from the process to write a block of data to the hybrid storage device, wherein the request includes a first address for the block of data in a first portion of an address space in the memory, wherein the first portion of the address space is mapped to a first device of the multiple non-volatile storage devices;
write at least a first portion of the block of data to the first address in response to the request; and
in response to a change in environmental state of the hybrid storage device, write at least a second portion of the block of data to a second address in a second portion of the address space in the memory, wherein the second portion of the address space is mapped by the process to a second device of the multiple non-volatile storage devices, the address space is common to the process and the hybrid storage device, and the address space includes addresses that refer to the memory.

20. The data processing system of claim 19 further comprising a thermal management controller to manage removal of heat from the first device of the hybrid storage device and the change in environmental state causes the first device to enter one of multiple degraded operating states associated with an internal temperature of the first device, the multiple degraded operating states including a first degraded operating state associated with a first temperature boundary and a second degraded operating state associated with a second temperature boundary, and a thermal emergency state associated with a third temperature boundary, the third temperature boundary higher than the first and second temperature boundary.

21. A non-transitory computer-readable medium storing instructions which, when executed by one or more processors of an electronic device, cause the electronic device to perform operations to write a block of data to a hybrid storage device, the operations comprising:
mapping a first portion of an address space of the electronic device to a first non-volatile storage device of the hybrid storage device;
mapping a second portion of the address space of the electronic device to a second non-volatile storage device of the hybrid storage device, the first non-volatile storage device having different performance characteristics relative to the second non-volatile storage device, wherein the address space is common to the electronic device and the hybrid storage device and includes memory addresses referring to memory on the electronic device;
sending a request via an interface circuit of the hybrid storage device to write a block of data to the hybrid storage device, the request including an address that maps to the first portion of the address space, wherein the hybrid storage device writes at least a first portion of the block of data to the address; and
writing at least a second portion of the block of data to the second portion of the address space in response to a change in environmental state information of the hybrid storage device during the writing of the first portion of the block of data.

22. The non-transitory computer-readable medium as in claim 21, wherein the change in environmental state information indicates that the first non-volatile storage device has entered one of multiple degraded operating states.

23. The non-transitory computer-readable medium as in claim 22, wherein the multiple degraded operating states are associated with multiple ranges of internal temperatures of the first non-volatile storage device, the multiple degraded operating states including a first degraded operating state associated with a first temperature range, a second degraded operating state associated with a second, higher temperature range, and a thermal emergency state associated with a third temperature range, the third temperate range higher than the first and second temperature range.

* * * * *